(12) United States Patent
Swisher et al.

(10) Patent No.: US 9,733,077 B2
(45) Date of Patent: Aug. 15, 2017

(54) LEVELING APPARATUS AND METHODS OF USE THEREOF

(75) Inventors: John G. Swisher, Mahwah, NJ (US); Janna Makaeva, Mahwah, NJ (US)

(73) Assignee: INNOVATIVE ART CONCEPTS, LLC, Ramsey, NJ (US)

( * ) Notice: Subject to any disclaimer, the term of this patent is extended or adjusted under 35 U.S.C. 154(b) by 27 days.

(21) Appl. No.: 13/980,129

(22) PCT Filed: Jan. 23, 2012

(86) PCT No.: PCT/US2012/022224
§ 371 (c)(1),
(2), (4) Date: Oct. 1, 2013

(87) PCT Pub. No.: WO2012/100252
PCT Pub. Date: Jul. 26, 2012

(65) Prior Publication Data
US 2014/0075769 A1    Mar. 20, 2014

Related U.S. Application Data

(60) Provisional application No. 61/435,234, filed on Jan. 21, 2011.

(51) Int. Cl.
G01C 9/28 (2006.01)
G01C 9/02 (2006.01)
B44D 2/00 (2006.01)
B42F 1/00 (2006.01)

(52) U.S. Cl.
CPC .............. *G01C 9/02* (2013.01); *B42F 1/006* (2013.01); *B44D 2/007* (2013.01); *G01C 9/28* (2013.01)

(58) Field of Classification Search
CPC ............ B44D 2/007; B42F 1/006; G01C 9/28
USPC ................. 33/334, 347, 370, 371, 372, 379
See application file for complete search history.

(56) References Cited

U.S. PATENT DOCUMENTS

| | | | |
|---|---|---|---|
| 2,677,192 A * | 5/1954 | Anderson | 33/372 |
| 3,878,618 A * | 4/1975 | Freeman | 33/379 |
| 4,745,668 A * | 5/1988 | Endo et al. | 29/25.42 |
| 5,799,404 A * | 9/1998 | Payne | 33/370 |
| 5,819,425 A * | 10/1998 | Payne | F16B 2/06 248/229.13 |
| 6,389,709 B1 * | 5/2002 | Lunde | 33/373 |
| 7,117,606 B2 * | 10/2006 | Brown | G01C 9/28 33/365 |
| 7,290,346 B2 | 11/2007 | Szumer et al. | |
| D642,040 S * | 7/2011 | Romine | D8/72 |
| 2002/0066199 A1 | 6/2002 | Hanson | |
| 2007/0164553 A1 | 7/2007 | Katz et al. | |

(Continued)

OTHER PUBLICATIONS

International Search Report and Written Opinion issued in PCT/US2012/022224, mailed Aug. 9, 2012.

*Primary Examiner* — G. Bradley Bennett
(74) *Attorney, Agent, or Firm* — FisherBroyles, LLP; Andrew K. Gonsalves, Esq.

(57) ABSTRACT

The present invention relates to a leveling apparatus, methods of using the leveling apparatus, and kits that include the leveling apparatus. The leveling apparatus is useful in various applications, including, without limitation, those applications that involve positioning a planar object (e.g., a wall stencil) against a substantially vertical surface (e.g., a wall) at a desired angle relative to horizontal (e.g., relative to the floor or ceiling).

13 Claims, 7 Drawing Sheets

(56) References Cited

U.S. PATENT DOCUMENTS

| | | | |
|---|---|---|---|
| 2009/0205214 A1* | 8/2009 | Wong | 33/371 |
| 2010/0115781 A1* | 5/2010 | Norelli | 33/371 |
| 2011/0146091 A1* | 6/2011 | Spaulding | G01C 9/26 33/372 |
| 2013/0283625 A1* | 10/2013 | Sullivan | G01C 9/28 33/371 |

* cited by examiner

LEVELING APPARATUS AND METHODS OF USE THEREOF

CROSS-REFERENCE TO RELATED APPLICATIONS

This application is a U.S. National Phase filing under 35 U.S.C. §371 of International Application No. PCT/US2012/022224, filed Jan. 23, 2012, and published as WO 2012/100252-A2 on Jul. 26, 2012, which claims benefit of priority from U.S. Provisional Patent Application Ser. No. 61/435,234, filed Jan. 21, 2011. The entire contents of each of the prior applications are incorporated herein by reference in their entirety.

FIELD OF THE INVENTION

The present invention relates to a leveling apparatus, methods of using the leveling apparatus, and kits that include the leveling apparatus.

BACKGROUND OF THE INVENTION

Planar objects such as wall stencils, posters, wall hangings, and the like are commonly applied to walls for decorative purposes. Oftentimes it is desirable to apply these planar objects to a wall in a consistent orientation (e.g., consistently horizontal in relation to the ground or ceiling). This is particularly true for repeatedly applying a stencil pattern to a wall.

Stencils have been used over the years to draw and paint images on surfaces such as paper, walls, and woodwork. However, depending on the surface to be stenciled, it can often be difficult to position the stencil correctly on the surface (e.g., on a vertical wall), particularly if the stencil is being used repeatedly on the surface and uniformity of positioning is desired.

Prior to the present invention, there has been a lack of an easy to use device or system to consistently, repeatedly, and efficiently apply decorative items such as stencil patterns to a wall.

The present invention is directed to overcoming these and other deficiencies in the art.

SUMMARY OF THE INVENTION

The present invention provides a leveling apparatus that is useful in various applications that involve positioning a planar object against a substantially vertical surface at a desired angle relative to horizontal. In a particular application, the leveling apparatus is useful for positioning stencils for application to a wall at desired angles relative to horizontal (e.g., relative to the floor or ceiling contacting the wall).

In one embodiment, the leveling apparatus of the present invention includes a support and a level indicator mounted on the support either directly or with a mounting assembly. The leveling apparatus has a front securing member and a back securing member. The front and back securing members each have top ends and bottom ends, with the bottom ends being configured to act together to removably secure at least one planar object there between. This embodiment can optionally include a top support member disposed between the top ends of the front and back securing members.

In another embodiment, the leveling apparatus of the present invention includes a support, a level indicator mounted on the support either directly or with a mounting assembly, and a top support member disposed between the top ends of the front and back securing members.

In another embodiment, the leveling apparatus of the present invention further includes opposing actuating members attached to the front and back securing members to assist in opening and closing the front and back securing members around the at least one planar object.

In another embodiment, the leveling apparatus of the present invention further includes a mounting assembly having a level indicator pivotally mounted on a protractor. The protractor can be configured in various arrangements, including, without limitation, having angular graduations thereon.

The present invention also provides a method for positioning a planar object against a substantially vertical surface at a desired angle relative to horizontal. The method involves (i) providing a leveling apparatus of the present invention; (ii) removably securing a planar object between the bottom ends of the front and back securing members of the leveling apparatus; and (iii) positioning the planar object by using the level indicator to guide the positioning of the support along a substantially vertical surface so that the planar object is at a desired angle relative to horizontal.

The present invention also provides a method for applying a stencil to a substantially vertical surface in a desired angle relative to horizontal. The method involves (i) providing a leveling apparatus of the present invention; (ii) removably securing a stencil between the bottom ends of the front and back securing members of the leveling apparatus; (iii) positioning the stencil by using the level indicator to guide the positioning of the support along a substantially vertical surface so that the stencil is at a desired angle relative to horizontal; and (iv) applying a writing or painting instrument to the stencil in order to transfer the pattern of the stencil to the substantially vertical surface at a described angle relative to horizontal.

The present invention also provides a stencil kit that includes (i) a leveling apparatus of the present invention and (ii) at least one stencil for use with the leveling apparatus.

BRIEF DESCRIPTION OF THE DRAWINGS

For the purpose of illustrating aspects of the present invention, there are depicted in the drawings certain embodiments of the invention. However, the invention is not limited to the precise arrangements and instrumentalities of the embodiments depicted in the drawings. Further, as provided, like reference numerals contained in the drawings are meant to identify similar or identical elements.

FIGS. 9A-9B are photographs showing one embodiment of a leveling apparatus of the present invention being used with a wall stencil to position the wall stencil against a wall for application of the stencil pattern to the wall.

FIG. 11 is an illustration showing the use of one embodiment of a leveling apparatus of the present invention being used to repeatedly apply the same wall stencil pattern to a wall in the same orientation relative to horizontal. The embodiment of the leveling apparatus shown includes a circular protractor (360 degree protractor). The wall stencil is being removably secured by the leveling apparatus, with the level indicator of the leveling apparatus guiding the positioning of the stencil in a particular orientation. The single-arrowed line indicates the horizontal direction and also the left-to-right order of application of the stencil pattern to the wall. As shown in this illustration, the stencil sheet need not be positioned horizontally to still enable the leveling apparatus to assist in positioning the stencil pattern at the desired angle relative to horizontal.

DETAILED DESCRIPTION OF THE INVENTION

The present invention provides a leveling apparatus that is useful in various applications that involve, inter alia, positioning a planar object against a substantially vertical surface at a desired angle relative to horizontal. The planar object can be any planar object that substantially resembles a sheet or sheet-like object in terms of width. For example, the planar object can include, without limitation, a stencil, a wall hanging, a poster, a sheet of paper, a fabric sheet, and the like. In a particular application, the leveling apparatus is useful for positioning stencils for application to a wall at desired angles relative to horizontal (e.g., relative to the floor or ceiling contacting the wall).

In one embodiment, the leveling apparatus of the present invention includes a support and a level indicator mounted on the support either directly or with a mounting assembly. The leveling apparatus has a front securing member and a back securing member. The front and back securing members each have top ends and bottom ends, with the bottom ends being configured to act together to removably secure at least one planar object there between. This embodiment can optionally include a top support member disposed between the top ends of the front and back securing members.

In another embodiment, the leveling apparatus of the present invention includes a support, a level indicator mounted on the support either directly or with a mounting assembly, and a top support member disposed between the top ends of the front and back securing members.

The level indicator can be mounted onto the support at any position that allows a user to view the level indicator while positioning the planar object. In a particular embodiment, the level indicator is mounted to the front securing member. In another embodiment the level indicator is mounted to the top support member.

The support can be of any configuration that can function to mount a level indicator thereto and that is effective to removably secure a planar object according to the present invention. In a particular embodiment, the support is configured as a continuous unit forming the front securing member, back securing member, and top support member.

The support can further include opposing actuating members attached to the front and back securing members to assist in opening and closing the front and back securing members around the at least one planar object. Various opposing actuating members used in the art for facilitating the opening of items such as binder clips and bag clips can be used in functional relationship with the support.

In one embodiment, the support includes an elongated actuated clip having opposing actuating members to assist in opening and closing the front and back securing members around the at least one planar object. For example, the elongated actuated clip is a spring-loaded clip.

In another embodiment, the leveling apparatus of the present invention further includes a mounting assembly having a level indicator pivotally mounted on a protractor.

The protractor can be configured in various arrangements that allow the user to set the level indicator at a desired angle as determined by the protractor. To that end, the protractor can include angular graduations for identifying a desired angle. The protractor can further include detents disposed about the periphery of the protractor to functionally correspond with the pivotally mounted level indicator at predetermined angle stops. The range of the protractor can be of any range, including, without limitation, a range of 45 degrees, 90 degrees, 180 degrees, 270 degrees, and 360 degrees.

The present invention also provides a method for positioning a planar object against a substantially vertical surface at a desired angle relative to horizontal. The method involves (i) providing a leveling apparatus of the present invention; (ii) removably securing a planar object between the bottom ends of the front and back securing members of the leveling apparatus; and (iii) positioning the planar object by using the level indicator to guide the positioning of the support along a substantially vertical surface so that the planar object is at a desired angle relative to horizontal. In embodiments that use a leveling apparatus that includes a protractor, the positioning of the planar object can be achieved by using the level indicator in conjunction with the protractor to guide the positioning of the support along a substantially vertical surface so that the planar object is at a desired angle relative to horizontal. The support can be removably secured to a side of the planar object to assist in positioning the planar object.

The present invention also provides a method for applying a stencil to a substantially vertical surface in a desired angle relative to horizontal. The method involves (i) providing a leveling apparatus of the present invention; (ii) removably securing a stencil between the bottom ends of the front and back securing members of the leveling apparatus; (iii) positioning the stencil by using the level indicator to guide the positioning of the support along a substantially vertical surface so that the stencil is at a desired angle relative to horizontal; and (iv) applying a writing or painting instrument to the stencil in order to transfer the pattern of the stencil to the substantially vertical surface at a described angle relative to horizontal. In embodiments that use a leveling apparatus that includes a protractor, the positioning of the stencil can be achieved by using the level indicator in conjunction with the protractor to guide the positioning of the support along a substantially vertical surface so that the stencil is at a desired angle relative to horizontal. The support can be removably secured to a side of the stencil to assist in positioning the stencil.

The present invention also provides a stencil kit that includes (i) a leveling apparatus of the present invention and (ii) at least one stencil for use with the leveling apparatus.

As provided herein, the level indicator of the leveling apparatus of the present invention can be any type of level indicator that is effective to determine a level position relative to horizontal, with horizontal being defined by the ground (e.g., the floor). Suitable level indicators can be bubble level indicators well known in the art.

As provided herein, the support of the leveling apparatus of the present invention can be any structure that can function to house a level indicator mounted thereon and to removably secure at least one planar object (such as a wall stencil). In one embodiment the support is such that it allows a user to read the level indicator in order to determine the horizontal position of the level indicator in order to position the planar object at a desired position/angle relative to horizontal. While the most likely desired position would be the same as horizontal, such desired position may be any angle determined by the user, as further discussed herein.

Figure 1:
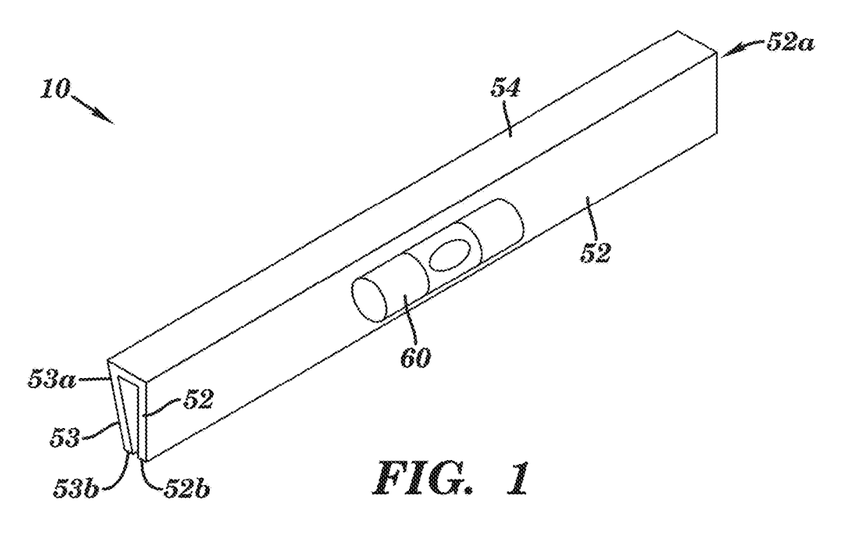
FIG. 1 is an illustration of one embodiment of the leveling apparatus of the present invention. The embodiment shown is configured to have a support as a continuous unit according to the present invention. The level indicator is mounted directly on the support, though it may also be mounted using a mounting assembly according to the present invention.

FIG. 1 is an illustration of one embodiment of the leveling apparatus of the present invention. As shown in FIG. 1, the leveling apparatus includes support 10 and level indicator 60. Support 10 is configured as a continuous unit that includes front securing member 52, back securing member 53, and top support member 54 disposed between the front and back securing members. In particular, as shown, top support member 54 is connected to top end 52a of front securing member 52 and top end 53a of back securing member 53. Bottom end 52b of front securing member 52 and bottom end 53b of back securing member 53 function to act together to removably secure at least one planar object there between according to the present invention. As shown in FIG. 1, level indicator 60 is mounted directly on front securing member 52 of support 10, although it may also be mounted using a mounting assembly according to the present invention.

Figure 7:
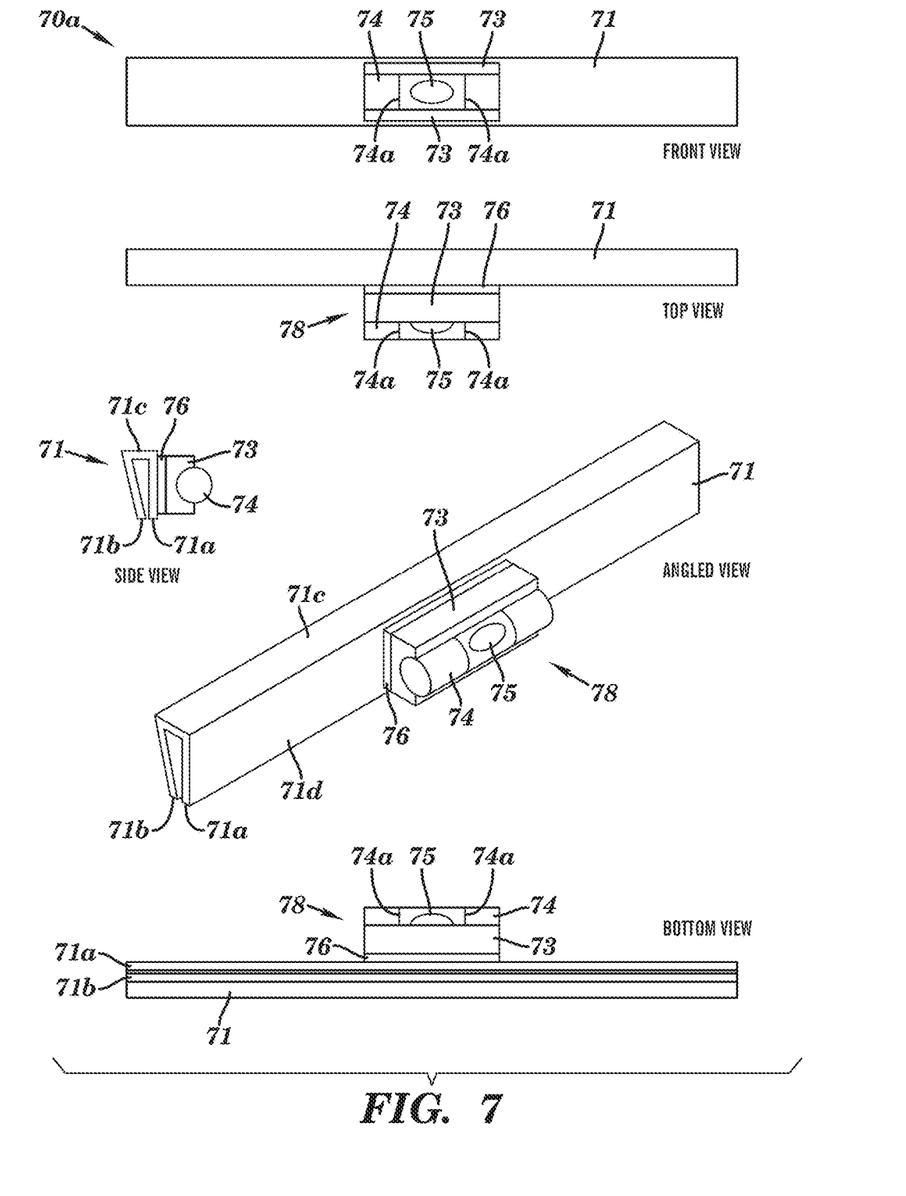
FIG. 7 are illustrations of various views of one embodiment of a leveling apparatus of the present invention. The views shown include a front view, a top view, a side view, an angled view, and a bottom view. The embodiment shown is configured to have a support as a continuous unit according to the present invention (e.g., a clip-on stencil level). The level indicator is mounted to the support using a mounting assembly. The mounting assembly is shown in detail.

As provided herein, the level indicator can be mounted directly to the support using any suitable direct mounting technique known in the relevant art, including, for example, through the use of adhesives, screws, staples, and the like. As provided herein, the level indicator can also be mounted to the support using a mounting assembly. Suitable mounting assemblies for use in the present invention include any mounting system that can be used to functionally house the level indicator on the support. A particular embodiment of a suitable mounting assembly is illustrated in FIG. 7.

Figure 2:
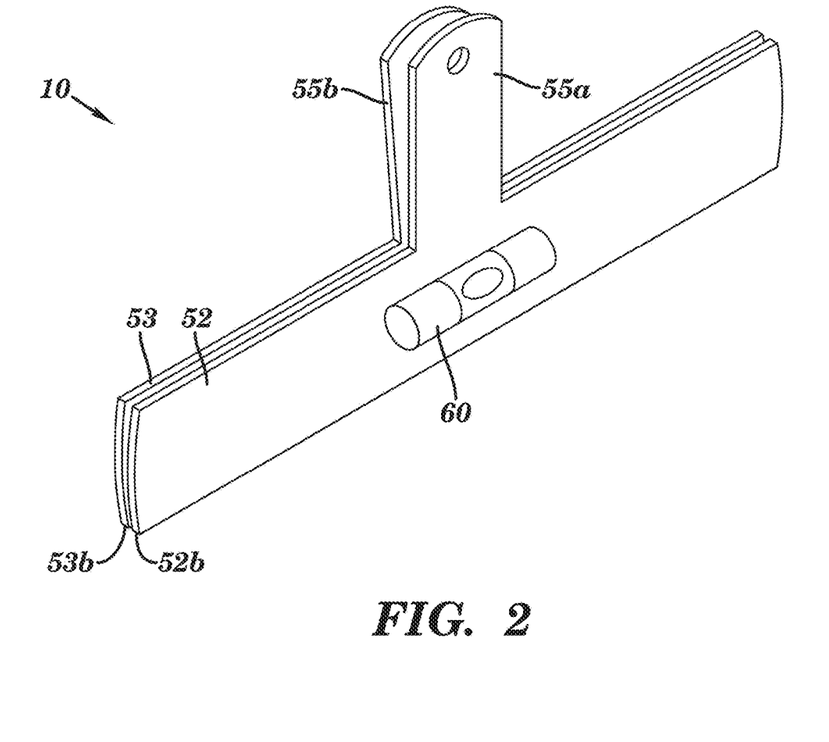
FIG. 2 is an illustration of one embodiment of the leveling apparatus of the present invention. The embodiment shown is configured to have a support that is an elongated actuated clip that has opposing actuating members according to the present invention. The level indicator is mounted directly on the support, though it may also be mounted using a mounting assembly according to the present invention.

FIG. 2 is an illustration of one embodiment of the leveling apparatus of the present invention. As shown in FIG. 2, the leveling apparatus of the present invention is configured to have support 10 that is an elongated actuated clip that has opposing actuating members (front actuating member 55a and back actuating member 55b) according to the present invention. As shown in FIG. 2, support 10 includes front securing member 52 having front actuating member 55a attached thereto and back securing member 53 having back actuating member 55b attached thereto. The level apparatus is shown in closed position, which is the position that functions to removably secure at least one planar object therein, with bottom end 52b of front securing member 52 and bottom end 53b of back securing member 53 being essentially in contact (e.g., pinching together), though they need not be in full contact and only need to be close enough to allow at least one planar object to be secured there between. The distance between or pinching pressure generated by the bottom ends of the front and back securing members in native state can be calibrated for removably securing one or more planar objects according to known procedures in the relevant art.

As shown in FIG. 2, level indicator 60 is mounted directly on front securing member 52 of support 10, though it may also be mounted using a mounting assembly according to the present invention. Further, as in each of the illustrative figures, the position of level indicator 60 need not be at the center of front securing member 52, but it can be positioned anywhere along front securing member 52 or even on front actuating arm 55a, or further on top support member 54 (see FIG. 1 for top support member 54). The embodiment shown in FIG. 2 also is one that allows for one-handed operation, in that the user can open and close the front and back securing members about a planar object using one hand.

As used herein the term "actuating" is meant to describe a mechanism whereby the two opposing actuating members are manually manipulated (e.g., pressed toward or away from one another) to open the bottom ends of the front and back securing members in order to allow the insertion of at least one planar object between the bottom ends of the front and back securing members. Conversely, when the opposing actuating members are not so manually manipulated (e.g., not pressed toward or away from one another) or are otherwise in their native steady state, the at least one planar object is removably secured by the support, i.e., by the front and back securing members.

Figure 3:
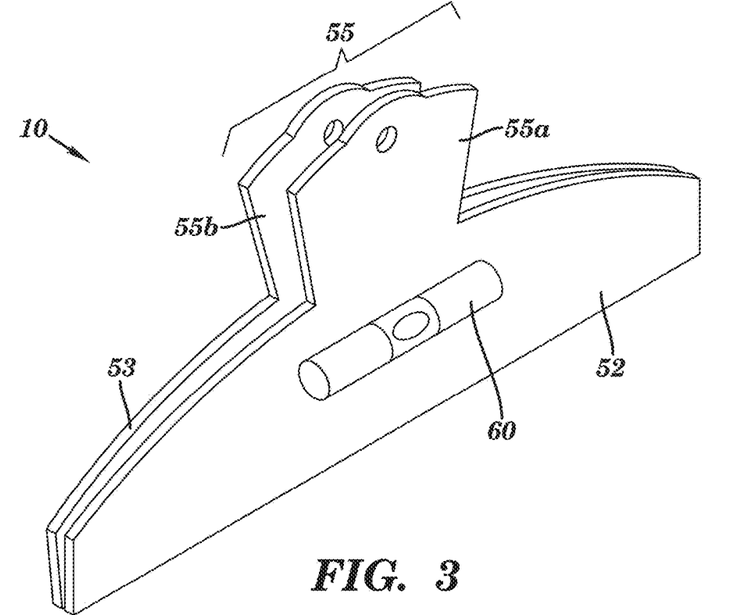
FIG. 3 is an illustration of one embodiment of the leveling apparatus of the present invention. The embodiment shown is configured to have a support that is an elongated actuated clip that has opposing actuating members according to the present invention. The level indicator is mounted directly on the support, though it may also be mounted using a mounting assembly according to the present invention.
Figure 4:
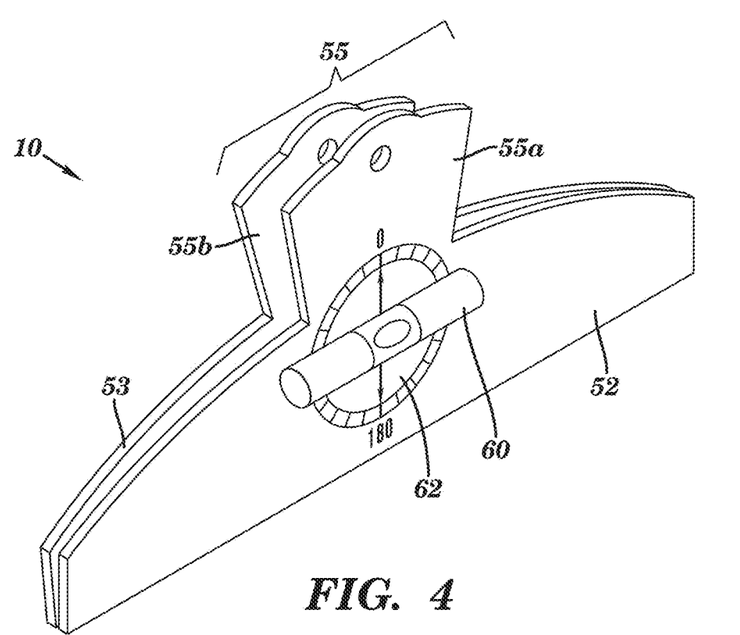
FIG. 4 is an illustration of one embodiment of the leveling apparatus of the present invention. The embodiment shown is configured to have a support that is an elongated actuated clip that has opposing actuating members according to the present invention. The level indicator is mounted over a protractor, with the protractor functioning as a mounting assembly according to the present invention.

FIGS. 3 and 4 are illustrations showing leveling apparatuses that are configured with similar supports 10. In the embodiments shown in FIGS. 3 and 4, support 10 is configured as an elongated actuated clip, similar to a bag clip used for clipping a potato chip bag in a closed or stored position (e.g., a CHIP CLIP). FIG. 3 shows an embodiment where level indicator 60 is directly mounted to support 10, while FIG. 4 shows an embodiment where level indicator 60 is mounted on top of protractor 62, with protractor 62 optionally serving as a mounting assembly for level indicator 60. The leveling apparatus embodiments shown in FIGS. 3 and 4 include opposing actuating members 55 with front actuating member 55a being formed as part of front securing member 52 and back actuating member 55b being formed as part of back securing member 53. However, as indicated herein throughout, the present invention contemplates that the opposing actuating members can be separate from the front and back securing members, as long as they are attached in some fashion in order to function to facilitate the spreading apart of the bottom ends of the front and back securing members to allow for the insertion of the at least one planar object between the front and back securing members in a removably secured manner.

Figure 5:
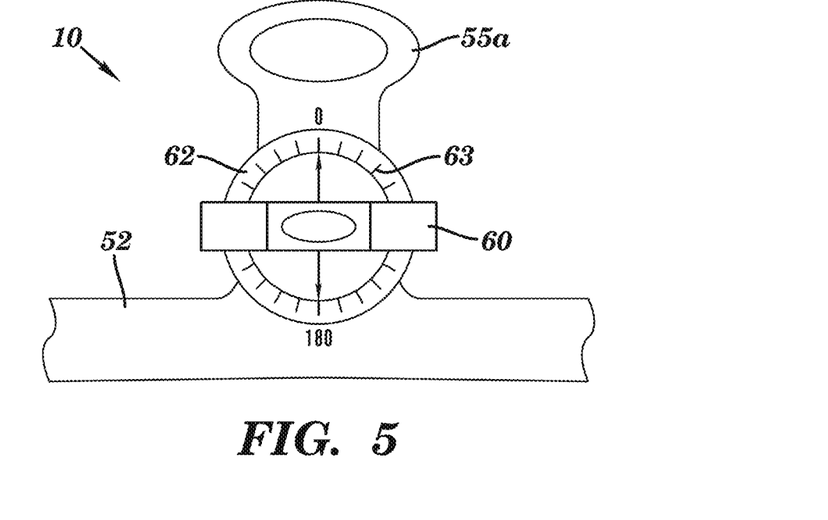
FIG. 5 is an illustration of a close-up view of one embodiment of the leveling apparatus of the present invention. The embodiment shown is configured to have a support that is an elongated actuated clip that has opposing actuating members according to the present invention. The level indicator is mounted over a protractor, with the protractor functioning as a mounting assembly according to the present invention. The protractor is a circular (360 degree) protractor.

FIG. 5 is an illustration of a close-up view of one embodiment of the leveling apparatus of the present invention. The embodiment shown is configured to have support 10 that is an elongated actuated clip that has opposing actuating members according to the present invention. As shown in FIG. 5, level indicator 60 is mounted over protractor 62, with protractor 62 optionally functioning as a mounting assembly according to the present invention. In the embodiment of FIG. 5, protractor 62 is a circular protractor (360 degree protractor) having angular graduations 63 to identify angle positions about the periphery of protractor 62. For illustrative purposes only, FIG. 5 shows just a portion of front securing member 52 (but does not show the back securing member) and shows only front actuating member 55a (but not the opposing back actuating member).

As provided herein, while FIG. 5 shows protractor 62 being disposed on a portion of front actuating member 55a, the present invention contemplates any suitable positioning of the protractor on the support, as long as the positioning is such that the protractor and level indicator function in combination to allow the user to dial the level indicator about the protractor in order to select a desired angle.

Figure 6:
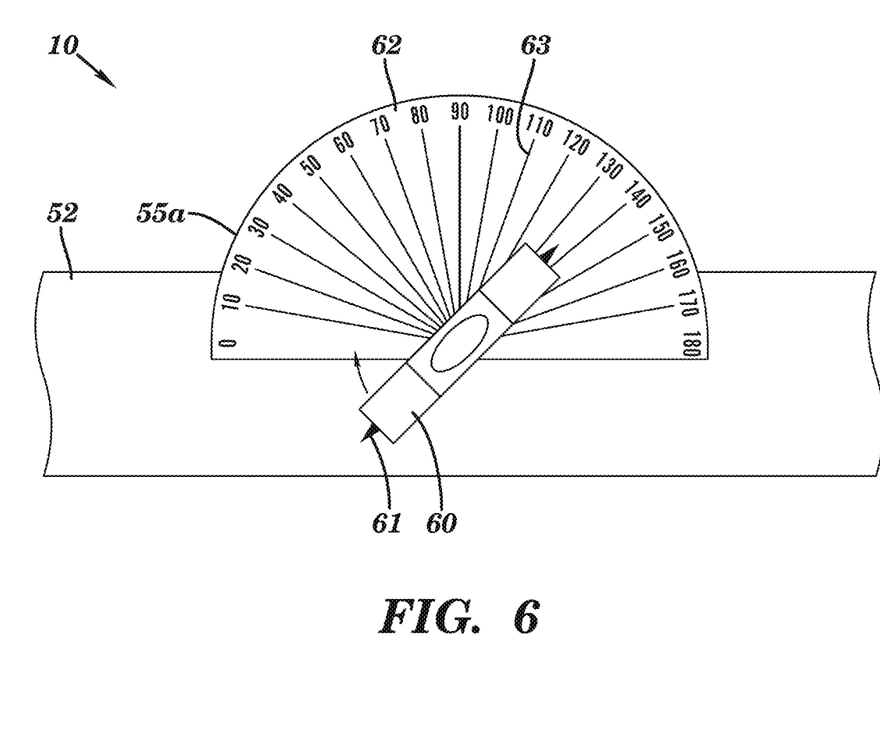
FIG. 6 is an illustration of a close-up view of one embodiment of the leveling apparatus of the present invention. The embodiment shown is configured to have a support that is an elongated actuated clip that has opposing actuating members according to the present invention. The level indicator is mounted over a protractor, with the protractor functioning as a mounting assembly according to the present invention. The protractor is a semi-circular (180 degree) protractor. The protractor also functions as the front actuating member, though it need not function as such, and can instead be mounted to the support or to a front actuating member. Also shown are level protractor guides at the opposing ends of the level indicator.

FIG. 6 is an illustration of a close-up view of one embodiment of the leveling apparatus of the present invention. The embodiment shown is configured to have support 10 that is an elongated actuated clip that has opposing actuating members according to the present invention. As shown in FIG. 6, level indicator 60 is mounted over protractor 62, with protractor 62 functioning as a mounting assembly according to the present invention. Further, protractor 62 is provided as a semi-circular protractor (180 degree protractor). In the particular embodiment shown in FIG. 6, protractor 62 also functions as front actuating member 55a, though it need not function as such, and can instead be mounted to support 10 or to a separate front actuating member. As shown in FIG. 6, the protractor can have angular graduations 63 marked on protractor 62 to aid the user in dialing or pivoting level indicator 60 around protractor 62 to a desired angle. Any mechanisms and techniques known in the art to mount the level indicator to pivot about the protractor can be used to assemble the leveling apparatus of the present invention. Further, as shown in FIG. 6, level protractor guides 61 can be added to the end or ends of level indicator 60 to assist in fine tuning level indicator at a desired angle about protractor 62, which can be used in conjunction with angular graduations 63. While specific angular graduations 63 are shown in FIG. 6, the present invention is not limited to only these angular graduations as shown. While not illustrated in FIG. 6, the level indicator can be mounted on a protractor with detent stops that allows the user to select any angle with specificity.

In one aspect, the present invention relates to the use of the leveling apparatus as a stencil leveling device for use with stencils for producing stenciled images on various types of surfaces.

The stencil leveling device (i.e., leveling apparatus) of the present invention may be used with any type of stencil. In one embodiment, the stencil leveling device (i.e., leveling apparatus) can be used with a self-aligning stencil device for producing multi-color and multi-layered images on various target surfaces. Suitable self-aligning stencil devices can include, without limitation, those described in U.S. Patent Application Publication No. US-2011/0174172 (entitled "Self-Aligning Stencil Device"), the disclosure of which is hereby incorporated by reference herein.

In another aspect, the present invention relates to kits that include the stencil leveling device (i.e., leveling apparatus) of the present invention, where other components of the kit can include, without limitation, at least one stencil and/or at least one painting supply for use in applying paint to a surface. In various embodiments, other components may be added to the kit of the present invention. For example, the kit can include a self-aligning stencil device (see US-2011/0174172). Also, the kit can include a foam applicator cap suitable for attaching to a paint bottle and for applying paint to the target surface using a stencil device, which in turn can be positioned by the stencil leveling device (i.e., leveling apparatus) of the present invention.

In a further aspect, the present invention relates to a method for using the stencil leveling device (i.e., leveling apparatus) with stencils in order to place the stencil in a desired position for stenciling.

In reference to stencils such as those described in US-2011/0174172, the stencil leveling device (i.e., leveling apparatus) can be configured to be securely or removably attached to a stencil (e.g., a stencil panel or securing panel of a self-aligning stencil device of US-2011/0174172). The leveling component (i.e., level indicator) can be configured to identify a level position of the central panel or other stencil relative to a horizontal plane. Further, the leveling component (i.e., level indicator) can be configured to identify any level position desirable to the user, whether or not that desired position is a level position of the central panel or other stencil relative to a horizontal plane. Suitable leveling components (i.e., level indicators) can include, without limitation, a bubble-in-liquid level, a clinometer, an LCD level, and the like. Further, in a particular embodiment, the leveling component (i.e., level indicator) can be a stencil leveling device particularly suited for use with stencils, including clip-on stencil level devices (see, e.g., FIGS. 1-11).

FIG. 7 are illustrations of various views of one embodiment of a leveling apparatus of the present invention. The embodiment shown is configured to have a support as a continuous unit according to the present invention (e.g., a clip-on stencil level). The level indicator is mounted to the support using a mounting assembly. The mounting assembly is shown in detail.

Figure 8:
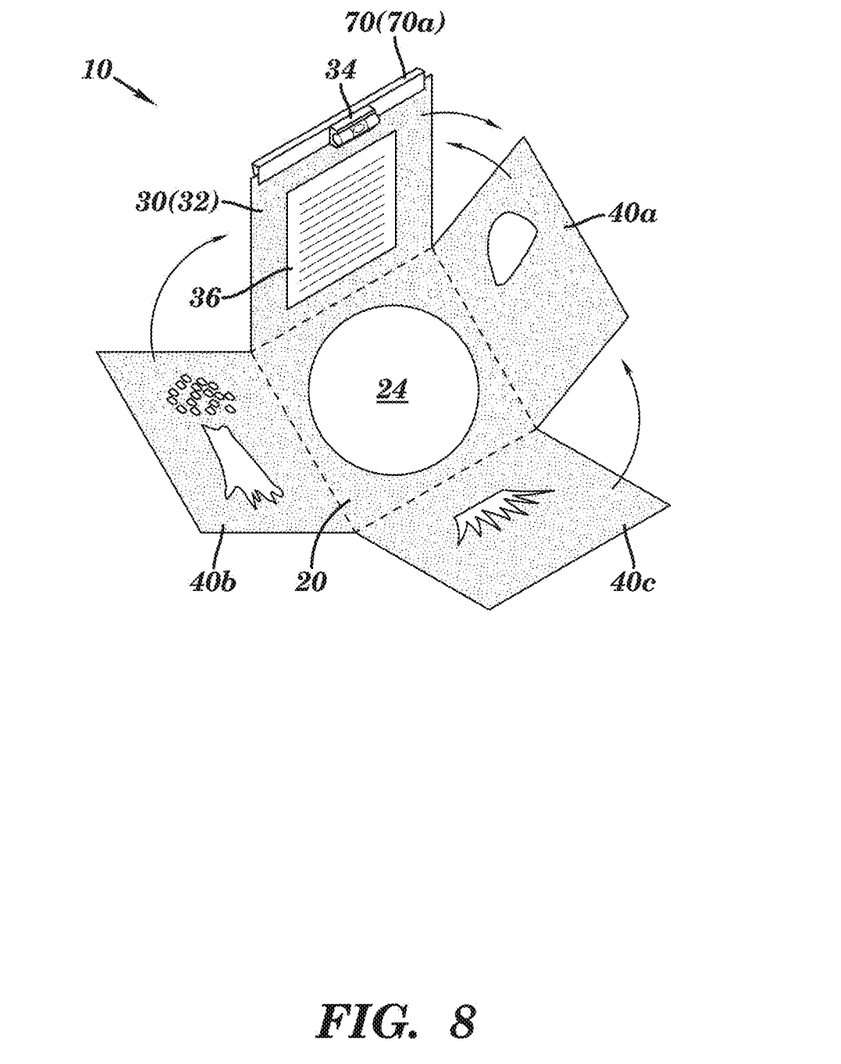
FIG. 8 is an illustration of one embodiment of a leveling apparatus of the present invention in combination with a self-aligning stencil device, such as a self-aligning stencil device described in U.S. Patent Application Publication No. US-2011/0174172 (entitled "Self-Aligning Stencil Device"), which is incorporated by reference herein. As shown, a leveling component 70 (e.g., a clip-on stencil level 70a) (also referred to as the "leveling apparatus") is attached to securing panel 32 of the self-aligning stencil device.

FIG. 8 is an illustration of one embodiment of a leveling apparatus of the present invention in combination with a self-aligning stencil device, such as a self-aligning stencil device described in U.S. Patent Application Publication No. US-2011/0174172 (entitled "Self-Aligning Stencil Device"), which is incorporated by reference herein. As shown, a leveling component 70 (e.g., a clip-on stencil level 70a) (also referred to as the "leveling apparatus") is attached to securing panel 32 of the self-aligning stencil device.

Figure 9A:
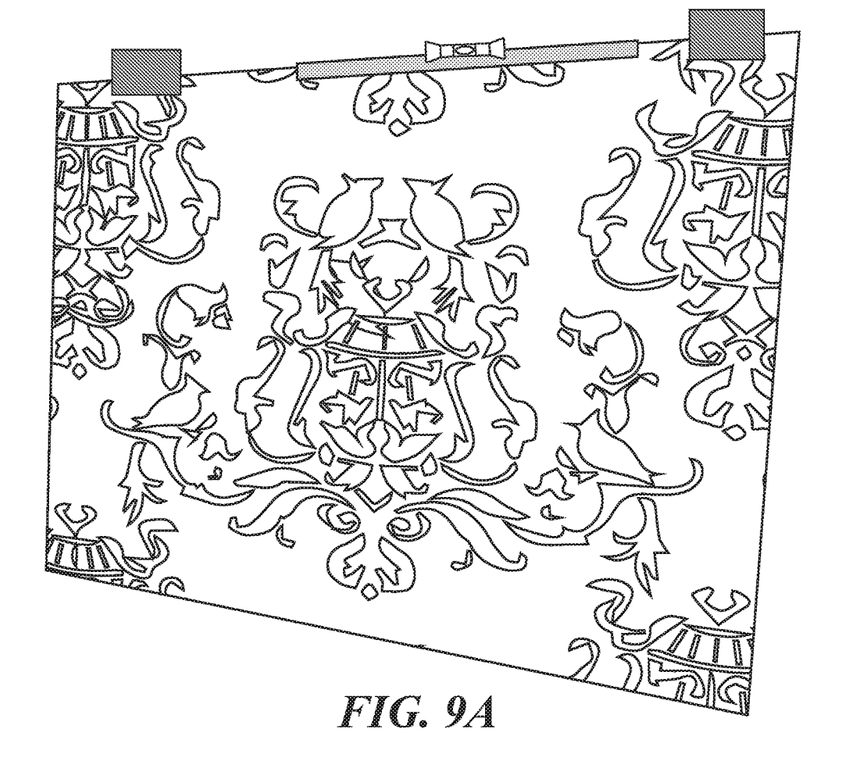
FIG. 9A is a view showing the entire stencil taped to the wall after being positioned thereon using the leveling apparatus, with the stencil being removably secured by the leveling apparatus.
Figure 9B:
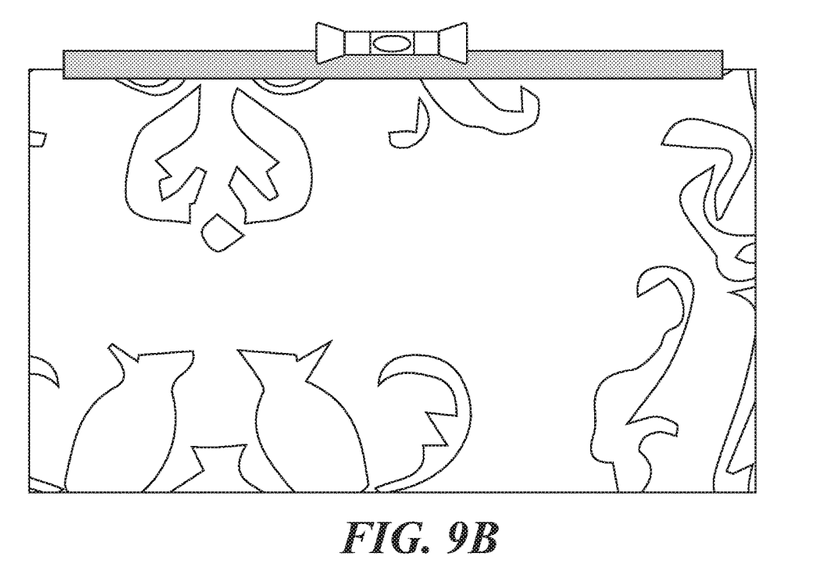
FIG. 9B is a close-up view of the leveling apparatus removably securing the top of the stencil.

FIGS. 9A-9B are photographs showing one embodiment of a leveling apparatus of the present invention being used with a wall stencil to position the wall stencil against a wall for application of the stencil pattern to the wall. FIG. 9A is a view showing the entire stencil taped to the wall after being positioned thereon using the leveling apparatus, with the stencil being removably secured by the leveling apparatus. FIG. 9B is a close-up view of the leveling apparatus removably securing the top of the stencil.

As shown in FIGS. 7, 8, 9A, and 9B, in one embodiment, leveling component 70 can be configured as a clip-on stencil level. As shown in FIGS. 7, 8, 9A, and 9B, this sort of leveling component 70 can clip to the top edge of securing panel 32, and can also serve as locking component 34 when storing the stencil device in its closed position. As shown in FIG. 7 clip-on stencil level 70a includes support bar 71 (e.g., C-Line Slide Binding Bar, Product No. CLI34551) having clip ends 71a and 71b, top support 71c, and front face 71d. The support bar 71 can be of any length, depending on the size of the stencil being used. For example, the support bar 71 can be only a few inches in length for small stencils to more than 3 feet in length for large stencils. Clip-on stencil level 70a also includes leveling unit 78 (e.g., Empire Level, Model No. 82PLP-W) attached to front face 71d of support bar 71. Leveling unit 78 includes holder 73 that acts as a support for bubble level component 74 that includes level indicator markings 74a, whereby a level position is indicated when bubble 75 is positioned between level indicator markings 74a. Holder 73 may be attached to front face 71d by attaching means 76 (e.g., Scotch foam mounting tape by 3M). Various types of support bar 71, leveling unit 78, and attaching means 76 are well known in the art, so that clip-on stencil level 70a can be made with any of these other types of components that make up clip-on stencil level 70a.

As shown in FIGS. 7, 8, 9A, and 9B, the stencil leveling device (i.e., leveling apparatus) can be in the form of a clip-on stencil level. Using the clip-on stencil level of the present invention makes positioning and leveling stencils of all types simple. For example, the clip-on stencil level of the present invention provides the stencil user with an alternative to traditional levels (which are bulky), plumb bobs (which can tangle), or laser levels (which are expensive).

In various aspects, to use the clip-on stencil level (i.e., leveling apparatus) of the present invention, the user simply slides the level (i.e., leveling apparatus) onto the stencil (e.g., at the top edge of the stencil), centers the level (i.e., leveling apparatus), and presses it down so that it sits firmly on the top of the stencil. The stencil (with the level in place) can then be positioned on the target surface (e.g., a vertical wall) and adjusted until the bubble in the level is centered. The stencil can then be removably secured to the wall, e.g., with a few pieces of tape (e.g., blue tape used in painting or the like). In one embodiment, the clip-on stencil level (i.e., leveling apparatus) of the present invention is light weight, so there is no need to remove it from the stencil during the stenciling process. Therefore, the level can remain attached/clipped to the stencil for the duration of an entire project. When the user has completed the stenciling, the stencil can be removed and stowed, or it can be used again at another location on the surface.

The clip-on stencil level (i.e., leveling apparatus) of the present invention can also be clipped to the sides or bottom of the stencil, depending on the desired placement of the stencil. For example, when stenciling the top of a wall (e.g., near crown molding), the user can attach the clip-on stencil level to the bottom edge of the stencil so that it is not in the way. Thus, due to the combined lightness and sufficient clipping/pinching pressure of the tips of the clip-on stencil level of the present invention, the stencil leveling device (i.e., leveling apparatus) of the present invention provides flexibility to the user.

The stencil leveling device (i.e., leveling apparatus) can also function as a locking mechanism or storage device for multiple stencils or sheets (see US-2011/0174172). Thus, the present invention also contemplates that the stencil leveling device (i.e., leveling apparatus) can be used as a storage device, whether or not it is being used to store stencils. For example, it can be used to bind and store any combination of sheet or sheet-like materials.

As noted, FIGS. 4, 5, and 6 illustrate embodiments of the leveling apparatus of the present invention that include protractor 62 on support 10 whereby protractor 62 functions in combination with level indicator 60. However, the present invention also provides that level indicator 60 can be pivotally attached to support 10 and need not be associated with a protractor in order to allow the user to dial or pivot level indicator 60 about support 10. The advantage of using protractor 62 in combination with level indicator 60 is that it provides for exact angle positioning of level indicator 60. However, for some applications and for some users there is no need for exact angle positioning, in that approximated position is adequate for the user. Whatever the configuration, attaching the level indicator so that it pivots around the support is advantageous because it allows the user to clip the leveling apparatus to either side (right or left) of the planar object, as well as to the top or bottom of the planar object. This is particularly helpful for applying planar objects such as wall stencils to a wall, where clipping the leveling apparatus to one edge (top, bottom, left side, or right side) of the wall stencil is not feasible, such as at the corner of two walls, top of the wall, or bottom of the wall.

Figure 10:
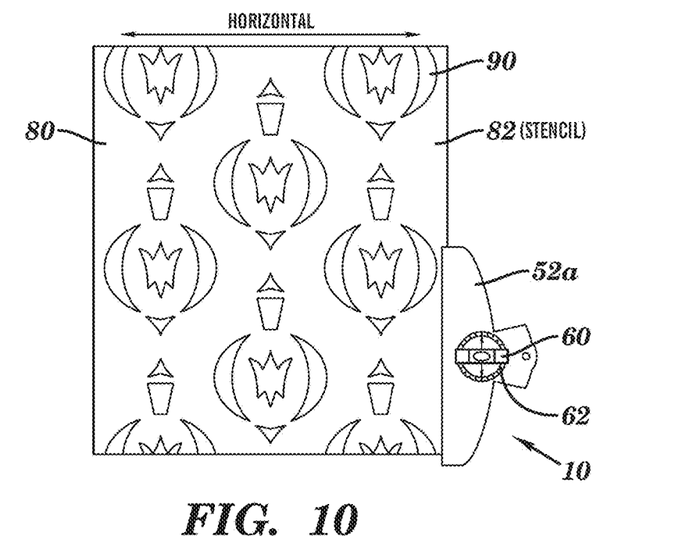
FIG. 10 is an illustration showing the use of one embodiment of a leveling apparatus of the present invention being used to position a wall stencil. The embodiment of the leveling apparatus shown includes a circular protractor (360 degree protractor). The right-hand side of the wall stencil is being removably secured by the leveling apparatus, with the level indicator of the leveling apparatus guiding the positioning of the stencil in a horizontal orientation. The double-arrowed line indicates the horizontal direction.
Figure 11:
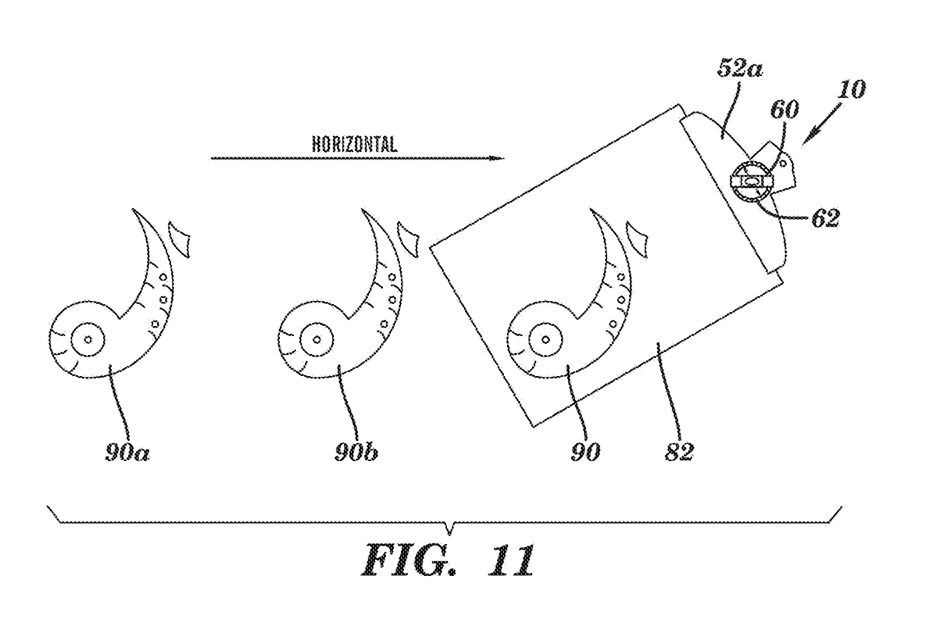

FIGS. 10 and 11 illustrate certain uses of the leveling apparatus, where the leveling apparatus has both level indicator 60 and protractor 62.

FIG. 10 is an illustration showing the use of one embodiment of a leveling apparatus of the present invention being used to position a wall stencil. As shown in FIG. 10, the leveling apparatus includes support 10 having level indicator 60 disposed on protractor 62, with protractor 62 being a circular protractor (360 degree protractor). The leveling apparatus is shown as being clipped to the right-hand side of planar object 80 (i.e., stencil 82 having stencil patterns 90). This positioning of the leveling apparatus is particularly useful when top or bottom mounting is not possible or not feasible. Level indicator 60 is shown as being dialed or pivoted about protractor 62 so that the side mount still allows the user to position wall stencil 82 in a horizontal manner (i.e., the top of stencil 82 maintains a horizontal relationship with the ground or floor).

FIG. 11 is an illustration showing the use of one embodiment of the leveling apparatus of the present invention to repeatedly and consistently apply the same wall stencil pattern 90 of wall stencil 82 to a wall in the same orientation relative to horizontal. As shown in FIG. 11, the leveling apparatus includes level indicator 60 disposed on protractor 62, with protractor 62 being a circular protractor (360 degree protractor). The leveling apparatus is shown as being clipped to the top of wall stencil 82 (illustrated as the right side of wall stencil 82 in FIG. 11), but with level indicator 60 being dialed/pivoted about protractor 62 at an angle that is not 0, 90, 180, or 360 degrees. In such an orientation, the user is interested in applying wall stencil pattern 90 to a wall in a slightly off-angle (i.e., not 0, 90, 180, or 360 degrees). FIG. 11 shows stencil pattern 90a and stencil pattern 90b as having already been applied to a wall in the same angle using the leveling apparatus of the present invention. FIG. 11 further shows wall stencil 82 oriented using the leveling apparatus to the right of applied wall stencil pattern 90b, and at the same relative angle so as to enable the user to apply a third wall stencil pattern to the wall in the same angle relative to horizontal as applied wall stencil patterns 90a and 90b.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A leveling apparatus as shown in FIG. 1 comprising:
    a support (10) having a front securing member (52) and a back securing member (53), wherein the front and back securing members (52, 53) each have top ends (52a, 53a) and bottom ends (52b, 53b), said bottom ends (52b, 53b) configured to act together to removably secure at least one planar object there between;
    a level indicator (60) mounted on the support (10) either directly or with a mounting assembly as shown in FIG. 7 (78); and
    a top support member (54) disposed between the top ends (52a, 53a) of the front and back securing members (52, 53), wherein said support (10) comprises a continuous unit forming the front securing member (52), back securing member (53), and top support member (54).

2. The leveling apparatus according to claim 1, wherein said level indicator (60) is mounted to the front securing member (52) or to the top support member (54).

3. The leveling apparatus according to claim 1, wherein said mounting assembly comprises a protractor having angular graduations thereon, and wherein said level indicator (60) is pivotally mounted on the protractor.

4. The leveling apparatus according to claim 3, wherein said protractor further comprises detents disposed about the periphery of the protractor to functionally correspond with the pivotally mounted level indicator (60) at predetermined angle stops.

5. The leveling apparatus according to claim 3, wherein said protractor is either a 180 degree protractor or a 360 degree protractor.

6. The leveling apparatus according to claim 1, wherein said support (10) is effective to removably secure a planar object selected from the group consisting of a stencil, a wall hanging, a poster, a sheet of paper, a fabric sheet, and the like.

7. A method for positioning a planar object against a substantially vertical surface at a desired angle relative to horizontal, said method comprising:
    providing a leveling apparatus according to claim 1;
    removably securing a planar object between the bottom ends (52b, 53b) of the front and back securing members (52, 53); and
    positioning the planar object by using the level indicator (60) to guide the positioning of the support (10) along a substantially vertical surface so that the planar object is at a desired angle relative to horizontal.

8. A method for applying a stencil to a substantially vertical surface in a desired angle relative to horizontal, said method comprising:
    providing a leveling apparatus according to claim 1;
    removably securing a stencil between the bottom ends (52b, 53b) of the front and back securing members (52, 53);
    positioning the stencil by using the level indicator (60) to guide the positioning of the support (10) along a substantially vertical surface so that the stencil is at a desired angle relative to horizontal; and
    applying a writing or painting instrument to the stencil in order to transfer the pattern of the stencil to the substantially vertical surface at a described angle relative to horizontal.

9. A method for positioning a planar object against a substantially vertical surface at a desired angle relative to horizontal, said method comprising:
    providing a leveling apparatus according to claim 3;
    removably securing a planar object between the bottom ends (52b, 53b) of the front and back securing members (52, 53); and
    positioning the planar object by using the level indicator (60) in conjunction with the protractor to guide the positioning of the support along a substantially vertical surface so that the planar object is at a desired angle relative to horizontal.

10. The method according to claim 9, wherein the support (10) is removably secured to a side of the planar object to assist in positioning the planar object.

11. A method for applying a stencil to a substantially vertical surface in a desired angle relative to horizontal, said method comprising:
    providing a leveling apparatus according to claim 3;
    removably securing a stencil between the bottom ends (52b, 53b) of the front and back securing members (52, 53);
    positioning the stencil by using the level indicator (60) in conjunction with the protractor to guide the positioning of the support (10) along a substantially vertical surface so that the stencil is at a desired angle relative to horizontal; and
    applying a writing or painting instrument to the stencil in order to transfer the pattern of the stencil to the substantially vertical surface at a described angle relative to horizontal.

12. The method according to claim 11, wherein the support (10) is removably secured to a side of the stencil to assist in positioning the planar object.

13. A stencil kit comprising:
    a leveling apparatus according to claim 1; and
    at least one stencil for use with the leveling apparatus.

* * * * *